Nov. 3, 1936.  E. A. CORBIN, JR  2,059,851
RIM WITH QUICK DETACHABLE SECTION
Filed Jan. 25, 1934
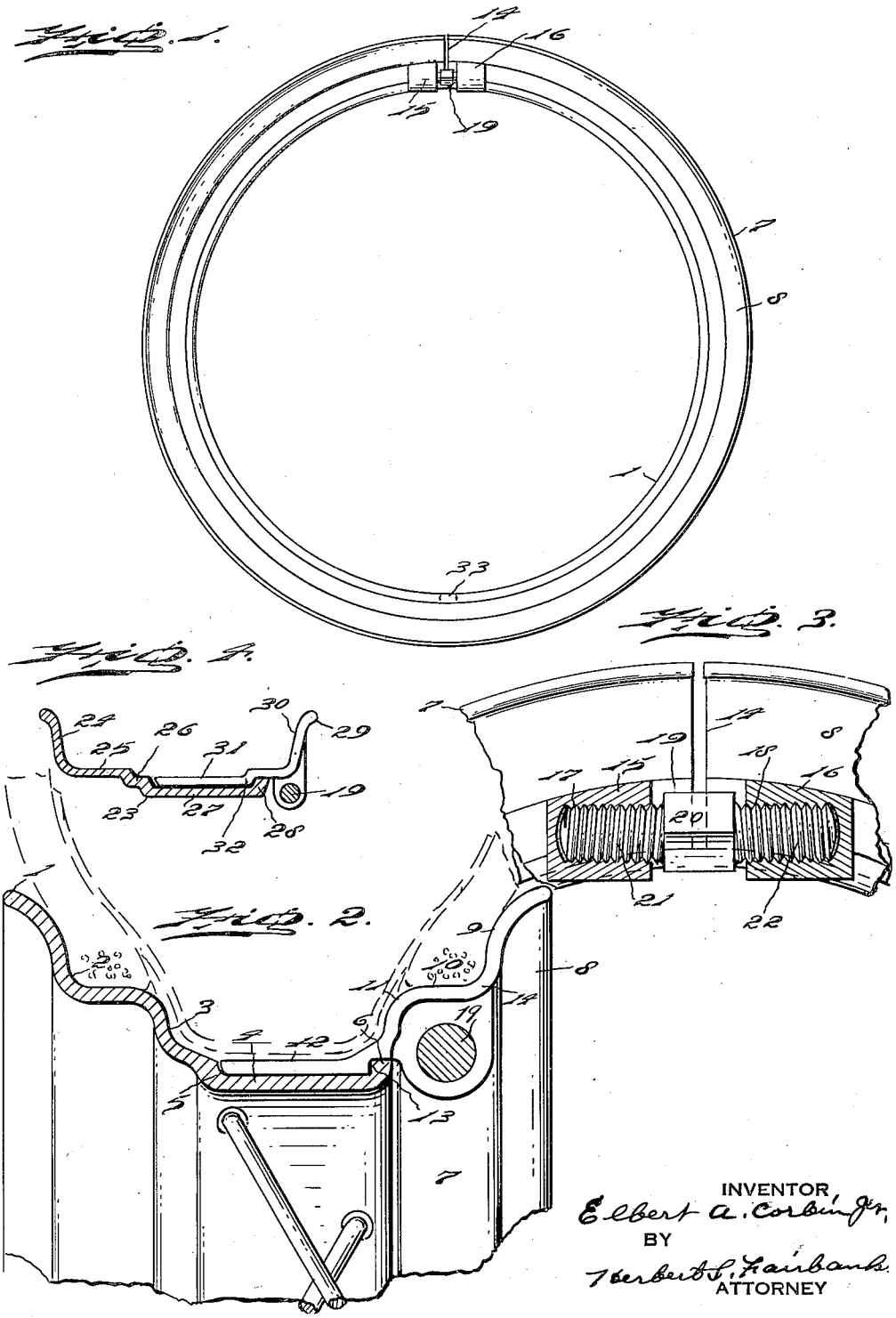
INVENTOR,
Elbert A. Corbin Jr.
BY
Herbert S. Fairbanks
ATTORNEY Patented Nov. 3, 1936

2,059,851

UNITED STATES PATENT OFFICE 2,059,851

RIM WITH QUICK DETACHABLE SECTION

Elbert A. Corbin, Jr., Gradyville, Pa.

Application January 25, 1934, Serial No. 708,186

4 Claims. (Cl. 152—21)

One object of this invention is to devise a novel tire receiving rim with a novel construction and arrangement of cooperating rim sections to provide for the quick assembly and removal of the tire.

A further object is to provide novel means to effect the expansion and contraction of the removable split rim section to facilitate its removal and assembly.

A further object of the invention is to devise a novel rim of the character described which can be in the form of a drop center rim or one in which a lateral seat is formed to receive the tire seatings.

In drop center type of rims the diameter of the outer flanges is greater than the drop center diameter. This variation in diameter causes considerable difficulty and trouble to the average driver in the replacement of a tire, and tubes are often pinched and flaps displaced with a consequent reduction in the durability and life of a tire.

My present invention has materially simplified the removal and assembly of the tire since a single locking and retaining member is employed to effect the expansion and retraction of the split, removable rim section.

This locking and retaining member is not essential in all cases since the inflated tire will hold the removable split rim section in place by peripheral pressure and the lock provides not only an additional safety feature but facilitates the expansion and contraction of such section during a tire replacement operation.

The locking mechanism is preferably placed diametrically opposite to the valve stem so that when the tire is on the rim, the latter will be inherently balanced.

With the above and other objects in view as will hereinafter clearly appear, my invention comprehends a novel rim with quick detachable section.

It further comprehends a novel construction of a rim having a fixed and a removable section, having a drop center or a straight seat and which can be very advantageously used on any type of vehicle wheels, especially those of trucks, busses and heavy vehicles.

It further comprehends a novel construction of a rim having a split removable section which interlocks with an annular wall or shoulder of the fixed rim section on relative lateral movement of such sections.

It further comprehends a novel locking mechanism forming a unit of construction with the removable rim section so that it will not drop off or be lost or misplaced during tire replacement.

Other novel features of construction and advantage will hereinafter appear in the detailed description and the appended claims.

For the purpose of illustrating the invention, I have shown in the accompanying drawing typical embodiments of it, which, in practice, will give satisfactory and reliable results. It is, however, to be understood that the various instrumentalities of which my invention consists can be variously arranged and organized, and my invention is not limited to the exact arrangement and organization of these instrumentalities as herein set forth.

Figure 1 is a side elevation of a tire receiving rim, embodying my invention.

Figure 2 is a transverse section, on an enlarged scale, of the rim construction.

Figure 3 is a side elevation of a portion of the rim, showing in section the detailed construction of the locking mechanism.

Figure 4 is a transverse section of the rim when constructed to form a straight seat instead of a drop center.

Similar numerals indicate corresponding parts.

Referring to the drawing:—

I designates the fixed rim section, which is connected with the felloe of the wheel in any desired or conventional manner. The fixed rim section I has its inboard flange inwardly curved as at 2, and then, downwardly and inwardly as at 3 to terminate in a drop center type of rim having a straight laterally extending portion 4, forming at its inboard side an annular shoulder 5 and at its outboard side an outwardly extending annular flange 6 which provides an annular shoulder with which the removable rim section 7 interlocks, as will be hereinafter clearly set forth. This removable rim section has its flange 8 curving inwardly and downwardly as at 9, then laterally and inwardly as at 10, downwardly and inwardly as at 11 and then laterally as at 12 to seat on the lateral extension 4 of the fixed rim. The shoulder 5, flange 6 and straight portion 4 contribute to form a depressed locking seat for the reception of the seat portion 12 of the removable rim section. The removable rim is provided with an annular, angularly shaped recess 13 to receive the flange 6 of the fixed rim and interlock therewith to prevent relative lateral movement of the rim sections when an inflated tire is on the rim. The removable rim section is transversely split as at 14.

The free ends of the removable rim are provided with the lugs 15 and 16 respectively which are interiorly threaded but have their threads directed in opposite directions. For example the lug 15 may have left hand thread as at 17 and the lug 16 a right hand thread as at 18, or vice versa.

19 designates a locking member having a central polygonally shaped portion 20 adapted to receive a wrench to effect its rotation in one direction or the other.

The member 19 has at one end a threaded rod or bolt 21 to engage the threads 17 of the lug 15, and at its opposite end a threaded rod or bolt 22, with its threads directed in the opposite direction to the threads of the rod 21, to engage the threads 18 of the lug 16.

By turning the member 19 in one direction the demountable split rim can be expanded so that it will pass over the flange 6 of the fixed rim, and by turning such member in the opposite direction the rim will be contracted to engage the seat formed by the extension 4 of the fixed rim, and interlock with the shoulder of such flange 6 and thus retain the rim sections in locked engagement. The threaded bores of the lugs 15 and 16 are closed at their outer ends so that there is no chance of dirt and foreign material entering such bores at their outer ends, and lubricant is retained.

In Fig. 4, I have shown the construction of the rim sections when a straight seat is desired instead of a drop center. 23 designates the fixed rim, the outer flange of which curves inwardly as at 24, laterally as at 25, then inwardly and laterally to form an annular seat 26, then inwardly and laterally to form the lateral extension 27 which latter terminates in an outwardly extending annular flange 28.

The detachable rim section 29 has its flange curving inwardly as at 30 and then extending laterally to seat on the outer face of the flange 28 and the seat 23 to have its outer face flush with the laterally extending portion 27 of the fixed rim.

The straight seating portion 31 is provided with a depending annular shoulder 32 which engages the inner wall of the flange 28 of the fixed rim to prevent relative movement of the fixed and detachable rims.

The locking member 19 and its adjuncts are constructed and operate in the same manner as that already described.

The opening 33 to receive the tire valve in Figure 1 is diametrically opposite the locking mechanism for the detachable rim section. This locking member in both forms of my invention as herein shown is an auxiliary safety device which may be omitted. I prefer, however, to employ it as it materially assists the expansion of the detachable rim section so that it will readily pass over the shoulder or flange of the fixed rim, and the maintenance of the detachable rim section in positive locked engagement with the fixed rim section.

The tire can be mounted on the quick detachable rim section in a deflated condition, and the tire and the detachable rim section are assembled on and removed from the fixed rim section as a unit of structure.

In accordance with this invention, I employ a single adjusting member to expand and contract the detachable rim and to retain it in the position to which it has been adjusted, so that I dispense with the necessity of employing locking bolts passing through the felloe or fixed rim section, and the conventional clamps and nuts for such bolts.

The locking member 19 forms a unit of structure with the detachable rim section, and due to oppositely directed threads at opposite ends a very quick and positive adjustment is provided in effecting the desired degree of expansion and contraction of the detachable, split rim section.

The laterally extending tire receiving seat such as 12 or 31 extends substantially across the depressed seat or felloe seating portion formed by the portions 4 or 27 of the fixed rim.

It will now be apparent that I have devised a new and useful rim with quick detachable section which embodies the features of advantage enumerated as desirable in the statement of the invention and the above description, and while I have, in the present instance, shown and described preferred embodiments thereof which will give in practice satisfactory and reliable results, it is to be understood that these embodiments are susceptible of modification in various particulars without departing from the spirit or scope of the invention or sacrificing any of its advantages.

Having thus described my invention what I claim as new and desire to secure by Letters Patent, is:

1. A rim having a fixed section having an annular depressed drop center seat extending laterally across the felloe portion and terminating in an annular raised shoulder, and a quick removable split rim section having an annular laterally extending drop center tire supporting portion extending substantially across said seat in bearing contact throughout its area with said seat and locking with said shoulder when said split rim section is contracted.

2. A rim comprising a fixed and a laterally removable split section, said fixed section having an inboard flange extending laterally outwardly to form a drop center tire seat having a depressed rim seat in its outer face terminating in an annular shoulder, said removable rim section having an outboard flange which curves inwardly and laterally to form an annular tire receiving portion to be received in said seat, to extend laterally across it and form a straight surface in bearing contact throughout its area with said rim seat and engaging said shoulder, and said removable section with the tire as a unit being assembled with the fixed rim by relative lateral displacement.

3. A rim having a fixed rim section having a flange curving inwardly and laterally and terminating in an annular lateral extension having a drop center depressed seat with an outwardly extending shoulder forming a flange at its free edge, a detachable split rim section having a flange curving inwardly and laterally and terminating in a lateral extension in bearing contact throughout its area with said seat seated on said shoulder forming flange and interlocking with said shoulder, lugs at the free ends of said detachable rim section, and an adjusting member having its free ends in threaded engagement with said lugs, the threads at one end being right hand threads and at the other end left hand threads.

4. In a tire rim, a fixed rim section having an outer flange and a lateral extension extending across the tire receiving portion and terminating in an outwardly extending annular shoulder contributing to form a drop center depressed seat, a detachable split rim having a lateral extension extending across the drop center seat and contacting throughout its area with said depressed seat and having an annular recess to receive said shoulder, lugs at the free ends of said detachable rim section having threaded bores closed at their outer ends, the threads of one bore being directed oppositely to the threads in the other bore, and an adjusting and locking member having its free ends in threaded engagement with said bores.

ELBERT A. CORBIN, Jr.